(12) United States Patent
Bushnell (10) Patent No.: US 7,954,769 B2
(45) Date of Patent: Jun. 7, 2011

(54) DEPLOYABLE AERODYNAMIC DEVICES WITH REDUCED ACTUATOR LOADS, AND RELATED SYSTEMS AND METHODS

(75) Inventor: Glenn S. Bushnell, Puyallup, WA (US)

(73) Assignee: The Boeing Company, Chicago, IL (US)

( * ) Notice: Subject to any disclaimer, the term of this patent is extended or adjusted under 35 U.S.C. 154(b) by 761 days.

(21) Appl. No.: 11/953,672

(22) Filed: Dec. 10, 2007

(65) Prior Publication Data

US 2009/0146000 A1   Jun. 11, 2009

(51) Int. Cl.
*B64C 3/58* (2006.01)
*B64C 9/00* (2006.01)

(52) U.S. Cl. .................. 244/213; 244/217; 244/204

(58) Field of Classification Search .............. 244/198, 244/201, 204, 204.1, 206, 212, 213–215, 244/217, 76 A, 87–90 A, 99.12, 99.13, 99.14, 244/99.2, 99.3, 234, 113, 110 D
See application file for complete search history.

(56) References Cited

U.S. PATENT DOCUMENTS

| | | | |
|---|---|---|---|
| 1,724,456 A | 8/1929 | Crook | |
| 1,770,575 A | 7/1930 | Ksoll | |
| 1,785,620 A * | 12/1930 | Frise | 244/216 |
| 2,086,085 A | 7/1937 | Lachmann et al. | |
| 2,138,952 A | 12/1938 | Blume | |
| 2,169,416 A | 8/1939 | Griswold | |
| 2,282,516 A | 5/1942 | Hans et al. | |
| 2,289,704 A | 7/1942 | Grant | |
| 2,319,383 A | 5/1943 | Zap | |
| 2,444,293 A | 6/1943 | Holt | |
| 2,347,230 A | 4/1944 | Zuck | |
| 2,358,985 A | 9/1944 | McAndrew | |
| 2,378,528 A | 6/1945 | Arsandaux | |
| 2,383,102 A | 8/1945 | Zap | |
| 2,385,351 A | 9/1945 | Davidsen | |
| 2,387,492 A | 10/1945 | Blaylock et al. | |
| 2,389,274 A | 11/1945 | Pearsall et al. | |
| 2,406,475 A | 8/1946 | Rogers | |

(Continued)

FOREIGN PATENT DOCUMENTS

DE   387833   1/1924

(Continued)

OTHER PUBLICATIONS

U.S. Appl. No. 11/966,361, filed Dec. 28, 2007, Huynh.

(Continued)

*Primary Examiner* — Joshua J Michener
(74) *Attorney, Agent, or Firm* — Perkins Coie LLP (57) ABSTRACT

Deployable aerodynamic devices with reduced actuator loads, and related systems and methods are disclosed. An external flow system in accordance with a particular embodiment includes an external flow body, a deployable device carried by and movable relative to the external flow body, and a coupling connected between the external flow body and the deployable device. The system can further include an actuator device operatively coupled between the external flow body and the deployable device, with the actuator device positioned to move the deployable device along a motion path between a stowed position and the deployed position. The motion path can have a first portion over which the load delivered by the actuator device increases as the deployed device moves toward the deployed position, and a second portion over which the load delivered by the actuator device decreases as the deployed device moves toward the deployed position.

19 Claims, 8 Drawing Sheets

U.S. PATENT DOCUMENTS

| | | | |
|---|---|---|---|
| 2,421,694 A | 6/1947 | Hawkins et al. | |
| 2,422,296 A | 6/1947 | Flader et al. | |
| 2,458,900 A | 1/1949 | Erny | |
| 2,502,315 A * | 3/1950 | Earhart | 244/216 |
| 2,504,684 A | 4/1950 | Harper | |
| 2,518,854 A | 8/1950 | Badenoch | |
| 2,549,760 A * | 4/1951 | George | 244/215 |
| 2,563,453 A | 8/1951 | Briend | |
| 2,652,812 A | 9/1953 | Fenzl | |
| 2,665,084 A | 1/1954 | Feeney et al. | |
| 2,665,085 A | 1/1954 | Crocombe | |
| 2,676,772 A * | 4/1954 | Salazar | 244/113 |
| 2,702,676 A | 2/1955 | Delaney, Jr. | |
| 2,851,229 A | 9/1958 | Clark | |
| 2,864,239 A | 12/1958 | Taylor | |
| 2,877,968 A | 3/1959 | Granan et al. | |
| 2,886,008 A | 5/1959 | Geyer et al. | |
| 2,891,740 A | 6/1959 | Campbell | |
| 2,892,312 A | 6/1959 | Allen et al. | |
| 2,899,152 A | 8/1959 | Weiland | |
| 2,912,190 A | 11/1959 | MacDonough | |
| 2,920,844 A | 1/1960 | Marshall et al. | |
| 2,938,680 A | 5/1960 | Greene et al. | |
| 2,942,813 A * | 6/1960 | English | 244/129.5 |
| 2,990,144 A | 6/1961 | Houghland | |
| 2,990,145 A | 6/1961 | Houghland | |
| 3,013,748 A | 12/1961 | Westburg | |
| 3,089,666 A | 5/1963 | Quenzler | |
| 3,102,607 A | 9/1963 | Roberts | |
| 3,112,089 A | 11/1963 | Dornier | |
| 3,136,504 A | 6/1964 | Carr | |
| 3,166,271 A | 1/1965 | Zuck | |
| 3,191,147 A | 6/1965 | Majendie | |
| 3,203,275 A | 8/1965 | Hoover | |
| 3,203,647 A | 8/1965 | Alvarez-Calderon | |
| 3,263,946 A | 8/1966 | Roberts et al. | |
| 3,282,535 A | 11/1966 | Steiner | |
| 3,375,998 A | 4/1968 | Alvarez-Calderon | |
| 3,423,858 A | 1/1969 | Speno | |
| 3,447,763 A | 6/1969 | Allcock | |
| 3,463,418 A | 8/1969 | Miksch | |
| 3,486,720 A * | 12/1969 | Seglem et al. | 244/210 |
| 3,504,870 A | 4/1970 | Cole et al. | |
| 3,528,632 A | 9/1970 | Miles et al. | |
| 3,539,133 A | 11/1970 | Robertson | |
| 3,556,439 A | 1/1971 | Autry et al. | |
| 3,583,660 A * | 6/1971 | Hurkamp et al. | 244/207 |
| 3,587,311 A | 6/1971 | Hays, Jr. | |
| 3,589,648 A | 6/1971 | Gorham et al. | |
| 3,594,851 A | 7/1971 | Swatton | |
| 3,642,234 A | 2/1972 | Kamber et al. | |
| 3,653,611 A | 4/1972 | Trupp et al. | |
| 3,659,810 A | 5/1972 | Robertson | |
| 3,677,504 A | 7/1972 | Schwarzler et al. | |
| 3,704,828 A | 12/1972 | Studer et al. | |
| 3,704,843 A | 12/1972 | Jenny | |
| 3,711,039 A | 1/1973 | James | |
| 3,730,459 A | 5/1973 | Zuck | |
| 3,743,219 A | 7/1973 | Gorges et al. | |
| 3,767,140 A | 10/1973 | Johnson | |
| 3,790,106 A | 2/1974 | Sweeney et al. | |
| 3,794,276 A | 2/1974 | Maltby et al. | |
| 3,804,267 A | 4/1974 | Cook et al. | |
| 3,807,447 A | 4/1974 | Masuda | |
| 3,813,062 A | 5/1974 | Prather | |
| 3,827,658 A | 8/1974 | Hallworth | |
| 3,831,886 A | 8/1974 | Burdges et al. | |
| 3,836,099 A | 9/1974 | O'Neill et al. | |
| 3,837,601 A | 9/1974 | Cole | |
| 3,847,369 A | 11/1974 | Phillips et al. | |
| 3,853,289 A | 12/1974 | Nevermann et al. | |
| 3,862,730 A | 1/1975 | Heiney | |
| 3,874,617 A | 4/1975 | Johnson | |
| 3,897,029 A | 7/1975 | Calderon et al. | |
| 3,904,152 A | 9/1975 | Hill | |
| 3,910,530 A | 10/1975 | James et al. | |
| 3,913,450 A | 10/1975 | MacGregor | |
| 3,917,192 A | 11/1975 | Alvarez-Calderon et al. | |
| 3,931,374 A | 1/1976 | Moutet nee Layrisse et al. | |
| 3,941,334 A | 3/1976 | Cole | |
| 3,941,341 A | 3/1976 | Brogdon, Jr. | |
| 3,949,957 A | 4/1976 | Portier et al. | |
| 3,968,946 A | 7/1976 | Cole | |
| 3,985,319 A | 10/1976 | Dean et al. | |
| 3,987,983 A | 10/1976 | Cole | |
| 3,991,574 A | 11/1976 | Frazier | |
| 3,992,979 A | 11/1976 | Smith et al. | |
| 3,993,584 A | 11/1976 | Owen et al. | |
| 3,994,451 A | 11/1976 | Cole | |
| 4,011,888 A | 3/1977 | Welchel et al. | |
| 4,015,787 A | 4/1977 | Maieli et al. | |
| 4,049,219 A | 9/1977 | Dean et al. | |
| 4,106,730 A | 8/1978 | Spitzer et al. | |
| 4,117,996 A | 10/1978 | Sherman | |
| 4,120,470 A | 10/1978 | Whitener | |
| 4,131,253 A | 12/1978 | Zapel | |
| 4,146,200 A | 3/1979 | Borzachillo | |
| 4,171,787 A | 10/1979 | Zapel | |
| 4,172,575 A | 10/1979 | Cole | |
| 4,180,222 A | 12/1979 | Thornburg | |
| 4,181,275 A | 1/1980 | Moelter et al. | |
| 4,189,120 A | 2/1980 | Wang | |
| 4,189,121 A | 2/1980 | Harper et al. | |
| 4,189,122 A | 2/1980 | Miller | |
| 4,200,253 A | 4/1980 | Rowarth et al. | |
| 4,202,519 A | 5/1980 | Fletcher | |
| 4,240,255 A | 12/1980 | Benilan et al. | |
| 4,247,843 A | 1/1981 | Miller | |
| 4,248,395 A | 2/1981 | Cole | |
| 4,262,868 A | 4/1981 | Dean | |
| 4,267,990 A | 5/1981 | Staudacher et al. | |
| 4,275,942 A | 6/1981 | Steidl | |
| 4,283,029 A | 8/1981 | Rudolph | |
| 4,285,482 A | 8/1981 | Lewis | |
| 4,293,110 A | 10/1981 | Middleton | |
| 4,312,486 A | 1/1982 | Mc Kinney | |
| 4,325,123 A | 4/1982 | Graham | |
| 4,351,502 A | 9/1982 | Statkus | |
| 4,353,517 A | 10/1982 | Rudolph | |
| 4,358,077 A | 11/1982 | Coronel | |
| 4,360,176 A | 11/1982 | Brown | |
| 4,363,098 A | 12/1982 | Buus et al. | |
| 4,365,774 A | 12/1982 | Coronel | |
| 4,368,937 A | 1/1983 | Palombo et al. | |
| 4,384,693 A | 5/1983 | Pauly | |
| 4,399,970 A | 8/1983 | Evans | |
| 4,427,168 A | 1/1984 | McKinney et al. | |
| 4,441,675 A | 4/1984 | Boehringer | |
| 4,444,368 A | 4/1984 | Andrews | |
| 4,448,375 A | 5/1984 | Herndon | |
| 4,459,084 A | 7/1984 | Clark | |
| 4,461,449 A | 7/1984 | Turner | |
| 4,470,569 A | 9/1984 | Shaffer et al. | |
| 4,471,925 A | 9/1984 | Kunz et al. | |
| 4,471,927 A | 9/1984 | Rudolph et al. | |
| 4,472,780 A | 9/1984 | Chenoweth et al. | |
| 4,475,702 A | 10/1984 | Cole | |
| 4,479,620 A | 10/1984 | Rogers et al. | |
| 4,485,992 A | 12/1984 | Rao | |
| 4,496,121 A | 1/1985 | Berlin | |
| 4,498,646 A | 2/1985 | Proksch | |
| 4,528,775 A | 7/1985 | Einarsson et al. | |
| 4,533,096 A | 8/1985 | Baker | |
| 4,542,869 A | 9/1985 | Brine | |
| 4,544,117 A | 10/1985 | Schuster et al. | |
| 4,553,722 A | 11/1985 | Cole | |
| 4,575,030 A | 3/1986 | Gratzer | |
| 4,575,099 A | 3/1986 | Nash | |
| 4,576,347 A | 3/1986 | Opsahl | |

| Patent No. | Date | Name |
|---|---|---|
| 4,605,187 A | 8/1986 | Stephenson |
| 4,618,109 A | 10/1986 | Victor |
| 4,637,573 A | 1/1987 | Perin |
| 4,650,140 A | 3/1987 | Cole |
| 4,669,687 A | 6/1987 | Rudolph |
| 4,687,162 A | 8/1987 | Johnson et al. |
| 4,691,879 A | 9/1987 | Greene |
| 4,700,911 A | 10/1987 | Zimmer |
| 4,702,441 A | 10/1987 | Wang |
| 4,702,442 A | 10/1987 | Weiland et al. |
| 4,706,913 A | 11/1987 | Cole |
| 4,712,752 A | 12/1987 | Victor |
| 4,717,097 A | 1/1988 | Sepstrup |
| 4,720,066 A | 1/1988 | Renken et al. |
| 4,729,528 A | 3/1988 | Borzachillo |
| 4,747,375 A | 5/1988 | Williams |
| 4,779,822 A | 10/1988 | Burandt et al. |
| 4,784,355 A | 11/1988 | Brine |
| 4,786,013 A | 11/1988 | Pohl et al. |
| 4,789,119 A | 12/1988 | Bellego et al. |
| 4,796,192 A | 1/1989 | Lewis |
| 4,808,023 A | 2/1989 | Arnold et al. |
| 4,823,836 A | 4/1989 | Bachmann et al. |
| 4,834,319 A | 5/1989 | Ewy et al. |
| 4,838,503 A | 6/1989 | Williams et al. |
| 4,854,528 A | 8/1989 | Hofrichter et al. |
| 4,856,735 A | 8/1989 | Lotz |
| 4,867,394 A | 9/1989 | Patterson, Jr. |
| 4,892,274 A | 1/1990 | Pohl et al. |
| 4,899,284 A | 2/1990 | Lewis et al. |
| 4,962,902 A | 10/1990 | Fortes |
| 4,991,800 A | 2/1991 | Schwarz |
| 5,039,032 A | 8/1991 | Rudolph |
| 5,046,688 A | 9/1991 | Woods |
| 5,050,081 A | 9/1991 | Abbott et al. |
| 5,056,741 A | 10/1991 | Bliesner et al. |
| 5,074,495 A | 12/1991 | Raymond |
| 5,082,207 A | 1/1992 | Tulinius |
| 5,088,665 A | 2/1992 | Vijgen et al. |
| 5,094,411 A | 3/1992 | Rao |
| 5,094,412 A | 3/1992 | Narramore |
| 5,100,082 A | 3/1992 | Archung |
| 5,114,100 A | 5/1992 | Rudolph et al. |
| 5,129,597 A | 7/1992 | Manthey |
| 5,158,252 A | 10/1992 | Sakurai |
| 5,167,383 A | 12/1992 | Nozaki |
| 5,203,619 A | 4/1993 | Welsch |
| 5,207,400 A | 5/1993 | Jennings |
| 5,244,269 A | 9/1993 | Harriehausen |
| 5,259,293 A | 11/1993 | Brunner et al. |
| 5,280,863 A | 1/1994 | Schmittle |
| 5,282,591 A | 2/1994 | Walters et al. |
| 5,310,387 A | 5/1994 | Savagian |
| 5,351,914 A | 10/1994 | Nagao et al. |
| 5,388,788 A | 2/1995 | Rudolph |
| 5,420,582 A | 5/1995 | Kubbat et al. |
| 5,441,218 A | 8/1995 | Mueller |
| 5,474,265 A | 12/1995 | Capbern et al. |
| 5,493,497 A | 2/1996 | Buus |
| 5,535,852 A | 7/1996 | Bishop |
| 5,542,684 A | 8/1996 | Squirrell et al. |
| 5,544,847 A | 8/1996 | Bliesner |
| 5,564,655 A | 10/1996 | Garland et al. |
| 5,600,220 A | 2/1997 | Thoraval et al. |
| 5,609,020 A | 3/1997 | Jackson et al. |
| 5,680,124 A | 10/1997 | Bedell |
| 5,681,014 A | 10/1997 | Palmer |
| 5,686,907 A | 11/1997 | Bedell |
| 5,711,496 A | 1/1998 | Nusbaum |
| 5,715,163 A | 2/1998 | Bang |
| 5,735,485 A | 4/1998 | Ciprian et al. |
| 5,740,991 A | 4/1998 | Gleine et al. |
| 5,743,490 A | 4/1998 | Gillingham |
| 5,788,190 A | 8/1998 | Siers |
| 5,839,698 A | 11/1998 | Moppert |
| 5,839,699 A | 11/1998 | Bliesner |
| 5,875,998 A | 3/1999 | Gleine et al. |
| 5,915,653 A | 6/1999 | Koppelman |
| 5,918,836 A | 7/1999 | Russ |
| 5,921,506 A | 7/1999 | Appa |
| 5,927,656 A | 7/1999 | Hinkleman |
| 5,934,615 A | 8/1999 | Treichler |
| 5,978,715 A | 11/1999 | Briffe et al. |
| 5,984,230 A | 11/1999 | Orazi |
| 6,015,117 A | 1/2000 | Broadbent et al. |
| 6,033,180 A | 3/2000 | Machida et al. |
| 6,045,204 A | 4/2000 | Frazier |
| 6,057,786 A | 5/2000 | Briffe |
| 6,073,624 A | 6/2000 | Laurent |
| 6,076,767 A | 6/2000 | Farley et al. |
| 6,076,776 A | 6/2000 | Breitbach |
| 6,079,672 A | 6/2000 | Lam et al. |
| 6,082,679 A | 7/2000 | Crouch et al. |
| 6,085,129 A | 7/2000 | Schardt |
| 6,109,567 A | 8/2000 | Munoz Saiz et al. |
| 6,112,141 A | 8/2000 | Briffe |
| 6,145,791 A | 11/2000 | Diller et al. |
| 6,152,405 A | 11/2000 | Muller et al. |
| 6,161,801 A | 12/2000 | Kelm et al. |
| 6,164,598 A | 12/2000 | Young et al. |
| 6,164,599 A | 12/2000 | Piening et al. |
| 6,173,924 B1 | 1/2001 | Young et al. |
| 6,188,937 B1 | 2/2001 | Sherry |
| 6,189,837 B1 | 2/2001 | Matthews |
| 6,213,433 B1 * | 4/2001 | Gruensfelder et al. ........ 224/213 |
| 6,227,498 B1 | 5/2001 | Arata |
| 6,244,542 B1 * | 6/2001 | Young et al. .................. 244/213 |
| 6,293,497 B1 | 9/2001 | Kelley-Wickemeyer |
| 6,328,265 B1 | 12/2001 | Dizdarevic |
| 6,349,798 B1 | 2/2002 | McKay et al. |
| 6,349,903 B2 | 2/2002 | Caton et al. |
| 6,364,254 B1 | 4/2002 | May et al. |
| 6,375,126 B1 | 4/2002 | Sakurai et al. |
| 6,382,566 B1 | 5/2002 | Ferrel et al. |
| 6,389,333 B1 | 5/2002 | Hansman |
| 6,431,498 B1 | 8/2002 | Watts et al. |
| 6,439,512 B1 | 8/2002 | Hart |
| 6,443,394 B1 | 9/2002 | Weisend |
| 6,450,457 B1 | 9/2002 | Sharp et al. |
| 6,464,175 B2 | 10/2002 | Yada et al. |
| 6,466,141 B1 * | 10/2002 | McKay et al. ................ 340/963 |
| 6,478,541 B1 | 11/2002 | Charles et al. |
| 6,481,667 B1 | 11/2002 | Ho |
| 6,484,969 B2 | 11/2002 | Sprenger |
| 6,499,577 B2 | 12/2002 | Kitamoto et al. |
| 6,536,714 B2 | 3/2003 | Gleine et al. |
| 6,547,183 B2 | 4/2003 | Farnsworth |
| 6,554,229 B1 | 4/2003 | Lam et al. |
| 6,561,463 B1 | 5/2003 | Yount et al. |
| 6,568,189 B2 | 5/2003 | Blot-Carretero et al. |
| 6,591,169 B2 | 7/2003 | Jones et al. |
| 6,598,829 B2 | 7/2003 | Kamstra |
| 6,598,834 B2 | 7/2003 | Nettle et al. |
| 6,601,801 B1 | 8/2003 | Prow et al. |
| 6,622,972 B2 | 9/2003 | Urnes, Sr. et al. |
| 6,622,974 B2 | 9/2003 | Dockter et al. |
| 6,625,982 B2 | 9/2003 | Van Den Bossche et al. |
| 6,644,599 B2 | 11/2003 | Perez |
| 6,651,930 B1 | 11/2003 | Gautier et al. |
| 6,698,523 B2 | 3/2004 | Barber |
| 6,729,583 B2 | 5/2004 | Milliere et al. |
| 6,745,113 B2 | 6/2004 | Griffin |
| 6,755,375 B2 | 6/2004 | Trikha |
| 6,796,526 B2 | 9/2004 | Boehringer |
| 6,796,534 B2 | 9/2004 | Beyer et al. |
| 6,799,739 B1 | 10/2004 | Jones |
| 6,802,475 B2 | 10/2004 | Davies et al. |
| 6,824,099 B1 | 11/2004 | Jones |
| 6,843,452 B1 | 1/2005 | Vassberg et al. |
| 6,860,452 B2 | 3/2005 | Bacon et al. |
| 6,870,490 B2 | 3/2005 | Sherry et al. |
| 6,978,971 B1 | 12/2005 | Dun |
| 6,981,676 B2 * | 1/2006 | Milliere ........................ 244/213 |
| 7,007,889 B2 | 3/2006 | Charron |
| 7,007,897 B2 | 3/2006 | Wingett et al. |
| 7,028,948 B2 | 4/2006 | Pitt |
| 7,048,228 B2 | 5/2006 | Vassberg et al. |
| 7,048,234 B2 | 5/2006 | Recksiek et al. |

| | | | |
|---|---|---|---|
| 7,048,235 | B2 | 5/2006 | McLean |
| 7,051,975 | B2 | 5/2006 | Pohl et al. |
| 7,051,982 | B1 | 5/2006 | Johnson |
| 7,059,563 | B2 | 6/2006 | Huynh |
| 7,121,780 | B2 | 10/2006 | Matich et al. |
| 7,147,241 | B2 | 12/2006 | Beaujot et al. |
| 7,177,731 | B2 | 2/2007 | Sandell et al. |
| 7,188,007 | B2 | 3/2007 | Boorman |
| 7,226,020 | B2 | 6/2007 | Pohl et al. |
| 7,243,881 | B2 | 7/2007 | Sakurai et al. |
| 7,258,308 | B2 | 8/2007 | Beyer |
| 7,264,206 | B2 | 9/2007 | Wheaton et al. |
| 7,270,305 | B2 | 9/2007 | Rampton |
| 7,300,021 | B2 | 11/2007 | Voogt |
| 7,766,282 | B2 | 8/2010 | Kordel et al. |
| 2002/0046087 | A1 | 4/2002 | Hey |
| 2003/0132860 | A1 | 7/2003 | Feyereisen et al. |
| 2003/0197097 | A1 | 10/2003 | Wakayama |
| 2004/0059474 | A1 | 3/2004 | Boorman et al. |
| 2005/0011994 | A1 | 1/2005 | Sakurai et al. |
| 2005/0017126 | A1 | 1/2005 | McLean et al. |
| 2005/0045765 | A1 | 3/2005 | Pitt |
| 2005/0061922 | A1 | 3/2005 | Milliere |
| 2005/0109876 | A1 | 5/2005 | Jones |
| 2005/0116115 | A1* | 6/2005 | Perez-Sanchez ............ 244/212 |
| 2005/0151028 | A1 | 7/2005 | Pohl et al. |
| 2005/0171652 | A1 | 8/2005 | Speer |
| 2005/0178903 | A1 | 8/2005 | Boorman et al. |
| 2005/0192717 | A1 | 9/2005 | Tafs et al. |
| 2005/0222721 | A1 | 10/2005 | Chen et al. |
| 2005/0224662 | A1 | 10/2005 | Lacy et al. |
| 2005/0228674 | A1 | 10/2005 | Gunn et al. |
| 2005/0231390 | A1 | 10/2005 | Crane et al. |
| 2005/0242234 | A1 | 11/2005 | Mahmulyin |
| 2005/0274847 | A1 | 12/2005 | Charron |
| 2006/0000952 | A1 | 1/2006 | Rampton et al. |
| 2006/0038086 | A1 | 2/2006 | Reckzeh |
| 2006/0049308 | A1 | 3/2006 | Good et al. |
| 2006/0102803 | A1 | 5/2006 | Wheaton et al. |
| 2006/0175468 | A1 | 8/2006 | Huynh |
| 2006/0226297 | A1 | 10/2006 | Perez-Sanchez |
| 2006/0245882 | A1 | 11/2006 | Khan et al. |
| 2007/0034748 | A1 | 2/2007 | Sakurai et al. |
| 2007/0114328 | A1 | 5/2007 | Lacy et al. |
| 2007/0114329 | A1 | 5/2007 | Lacy et al. |
| 2007/0176051 | A1 | 8/2007 | Good et al. |
| 2007/0252040 | A1 | 11/2007 | Kordel et al. |

FOREIGN PATENT DOCUMENTS

| | | |
|---|---|---|
| DE | 1129379 | 5/1962 |
| DE | 2144688 | 3/1973 |
| EP | 0 103 038 | 3/1984 |
| EP | 0 215 211 | 3/1987 |
| EP | 0 286 120 | 10/1988 |
| EP | 0 370 640 | 5/1990 |
| EP | 0 483 504 A1 | 5/1992 |
| EP | 0 489 521 | 6/1992 |
| EP | 0781704 A1 | 2/1997 |
| EP | 0 781 704 | 7/1997 |
| EP | 0 947 421 | 10/1999 |
| EP | 1010616 | 6/2000 |
| EP | 1338506 | 8/2003 |
| EP | 1 462 361 | 9/2004 |
| EP | 1 547 917 A1 | 6/2005 |
| FR | 705155 | 6/1931 |
| FR | 984443 | 7/1951 |
| FR | 56121 | 9/1952 |
| FR | 57988 | 9/1953 |
| FR | 58273 | 11/1953 |
| GB | 886136 | 1/1962 |
| GB | 1181991 A | 2/1970 |
| GB | 2144688 | 3/1985 |
| WO | WO-02/24530 | 3/2002 |

OTHER PUBLICATIONS

"Adaptive Aircraft: No Flight of Fancy?" Research into using exotic means of making wings change shpe in-flight looks promising, though still a long way from reality, Business Week Online, Jan. 7, 2003, pp. 1-3.

"Aero-Space Research & Technology," Space Systems, Sep. 1, 2001, pp. 1-28.

"Flap (aircraft)", Wikipedia, The Free Encyclopedia, Aug. 3, 2006, 10:18 UTC. Wikimedia Foundation, Inc. Aug. 5, 2006; http://wn.wikipedia.org/index.pho?title=Flap_%28aircraft%29&oldid=67413665>.

"Slats.", Wikipedia, The Free Encyclopedia. Jun. 27, 2006, 12:323 UTC. Wikimedia Foundation, Inc. Aug. 5, 2006; http://wn.wikipedia.org/w/index.php?title=Slats&oldid=60827639>.

777 Flight Deck (1 page); http://www.meriweather.com/777/777_main.html; [Accessed Jan. 28, 2003].

777 High Lift System, 777 Maintenance Manual, Publication Date: Circa 1994 (1 page).

777 Transmission—Typical, 777 Maintenance Manual, Publication Date: Circa 1994 (1 page).

A320 Hinterkantem-Klappen-Verstell System, Trailing Edge Flap System, SAE Presentation, Publication Date: Circa 1990 (1 page).

A340 Flight Controls, SAE Presentation, Publication Date: Circa 1995 (1 page).

Boeing, 777 Aircraft Maintenance Manual, Sep. 5, 2002 (p. 39).

Drela, M., "Optimization Techniques in Airfoil Design," MIT Aero & Astro, 29 pages; [date unknown].

Drela, Mark, "Design and Optimization Method for Multi-Element Airfoils," MIT Department of Aeronautics and Astronautics, Copyright 1993 American Institute of Aeronautics and Astronautics, Inc. (pp. 1-11).

Flap Drive System, 777 Maintenance Manual, Publication Date: Circa 1994 (1 page).

Flap Transmission and Support, 777 Maintenance Manual, Publication Date: Circa 1994 (1 page).

Hansen, H., "Application of Mini-Trailing-Edge Devices in the Awiator Project," Airbus Deutschland, EGAG, Hunefeldstr. 1-5, D-28199 Bremen, Germany, 9 pages; Jan. 7, 2003.

Junkers JU 52/3M (2 pages); http://www.wpafb.af.mil/museum/outdoor/od16;[Accessed Aug. 7, 2003].

Leaf Spring Retainer Seals; EMP, Inc.; 2 pgs; emp.com; [accessed Apr. 27, 2005].

MOOG, Component Maintenance Manual, May 1994 (2 pages).

Morphing Aircraft Structures, "Morphing Aircraft Structures-Raytheon," <<http://www.defense-update.com/products/m/morphing-structures.htm>>, pp. 1-3, [Accessed Aug. 31, 2005].

Morphing Aircraft Structures, "Morphing Aircraft Structures—The Cellular Approach," <http://www.personal.psu.edu/users/d/s/dsr134/mas/Cellular.htm>, Penn State University, pp. 1-3 [Accessed Aug. 31, 2005].

Morphing Systems, "Morphing Aerostructures—An Overview," www.crgrp.net/morphingsystems.htm <http://www.crgrp.net/morphingsystems.htm>, pp. 1-9, [Accessed Aug. 31, 2005].

Niu, Chen-Yen, Airframe Structural Design, Chen-Yeun Niu, Conmilit Press, 1988 (1 page).

Petrov, A.V., "Certain Types of Separated Flow over Slotted Wings," Fluid Mechanics—Soviet Research, vol. 7, No. 5, Sep.-Oct. 1978.

The High Speed Frontier, Chapter 2: The High-Speed Airfoil Program, "Supercritical" Airfoils, 1957-1978 (4 pages); http://www.hq.nasa.gov/office/pao/History/SP-445/ch2-5.

TU-144 Canard, 1 pg, (date unknown).

Whitcomb, Richard T., "Review of NASA Supercritical Airfoils," National Aeornautics and Space Administration, Aug. 1974 (pp. 8-18).

* cited by examiner

DEPLOYABLE AERODYNAMIC DEVICES WITH REDUCED ACTUATOR LOADS, AND RELATED SYSTEMS AND METHODS

TECHNICAL FIELD

Aspects of the present disclosure are directed generally to deployable devices (e.g., aerodynamic devices) with reduced actuator loads, and related systems and methods.

BACKGROUND

Deployable leading and trailing edge devices have been used for many years to control the attitude and lift/drag characteristics of modern aircraft. In particular, conventional trailing edge ailerons located on the left and right aircraft wings are deployed asymmetrically to roll the aircraft. Conventional trailing edge flaps are generally deployed symmetrically to create high-lift wing configurations suitable for landing and take-off. The flaps are then stowed for more efficient operation at cruise conditions. Conventional leading edge devices (e.g., leading edge slats) may also be deployed for landing and take-off, and then stowed at cruise conditions.

One drawback associated with many conventional leading and trailing edge devices is that the actuators that power these devices tend to be large so as to overcome the aerodynamic forces acting against the devices as the devices are deployed into the adjacent airstream. Large devices are difficult to integrate into the aircraft, and the weight of such devices reduces the efficiency of the aircraft. In addition, large actuators consume a significant amount of power and can accordingly further reduce the efficiency of the aircraft. Accordingly, there is a need for deployable aerodynamic devices that are smaller and/or more efficient than conventional devices.

SUMMARY

The present disclosure is directed generally toward deployable devices (e.g., aerodynamic devices) with reduced actuator loads, and related systems and methods. An aircraft system in accordance with a particular embodiment includes a lifting body and a deployable aerodynamic device carried by and moveable relative to the lifting body. The aerodynamic device can include a first component pivotably coupled to the lifting body at a first location, and a second component translatably coupled to the lifting body at a second location. The first and second components can be pivotably coupled to each other at a third location. The system can further include an actuator device coupled to the aerodynamic device and positioned to move the aerodynamic device relative to the lifting body along a motion path between a stowed position and a deployed position, with the aerodynamic device being exposed to an adjacent airstream when in the deployed position.

The foregoing arrangement of components can allow the aerodynamic forces acting on the deployable device to reduce the load required by the actuator device to deploy the deployable device. For example, in another embodiment, an external flow system includes an external flow body (e.g., an airfoil or other lifting body), a deployable device (e.g., an aerodynamic device) carried by and moveable relative to the external flow body, and a coupling connected between the wing and the deployable device. An actuator device can be operatively coupled between the external flow body and the deployable device and can be positioned to move the deployable device along a motion path between a stowed position and a deployed position. The motion path can have a first portion over which the load delivered by the actuator device increases as the deployed device moves toward the deployed position, and a second portion over which the load delivered by the actuator device decreases as the deployed device moves toward the deployed position. The first portion of the motion path is between the stowed position and the second portion of the motion path. In a further particular embodiment, the deployed position is one of multiple deployed positions, and the actuator device provides a peak load at a point along the motion path between the stowed position and the deployed position furthest from the stowed position.

Another aspect of the disclosure is directed to a method for operating an aircraft system. The method can include moving an aerodynamic device (carried by a lifting body) away from a stowed position and toward a deployed position over a first range of motion by increasing an output provided by an actuator device coupled to the aerodynamic device, while an external aerodynamic force on the aerodynamic device that opposes the motion increases. The method can further include moving the aerodynamic device toward the deployed position over a second range of motion beyond the first range of motion while decreasing the output provided by the actuator device as the external aerodynamic force opposing the motion of the aerodynamic device toward the deployed position decreases.

DETAILED DESCRIPTION

Aspects of the present disclosure are directed generally to deployable devices with reduced actuator loads, and related systems and methods. Representative deployable devices are described below in the context of aircraft installations (e.g., fixed-wing aircraft and rotorcraft), though in other embodiments, the devices can be installed on other external flow bodies. Several details describing structures or processes that are well-known and often associated with such systems and methods are not set forth in the following description for purposes of brevity. Moreover, although the following disclosure sets forth several representative embodiments of systems and methods that can include actuators with reduced load requirements, several other embodiments can have different configurations and/or different components than those described in this section. Accordingly, such embodiments may include additional elements and/or may eliminate one or more of the elements described below with reference to FIGS. 1-8.

Figure 1:
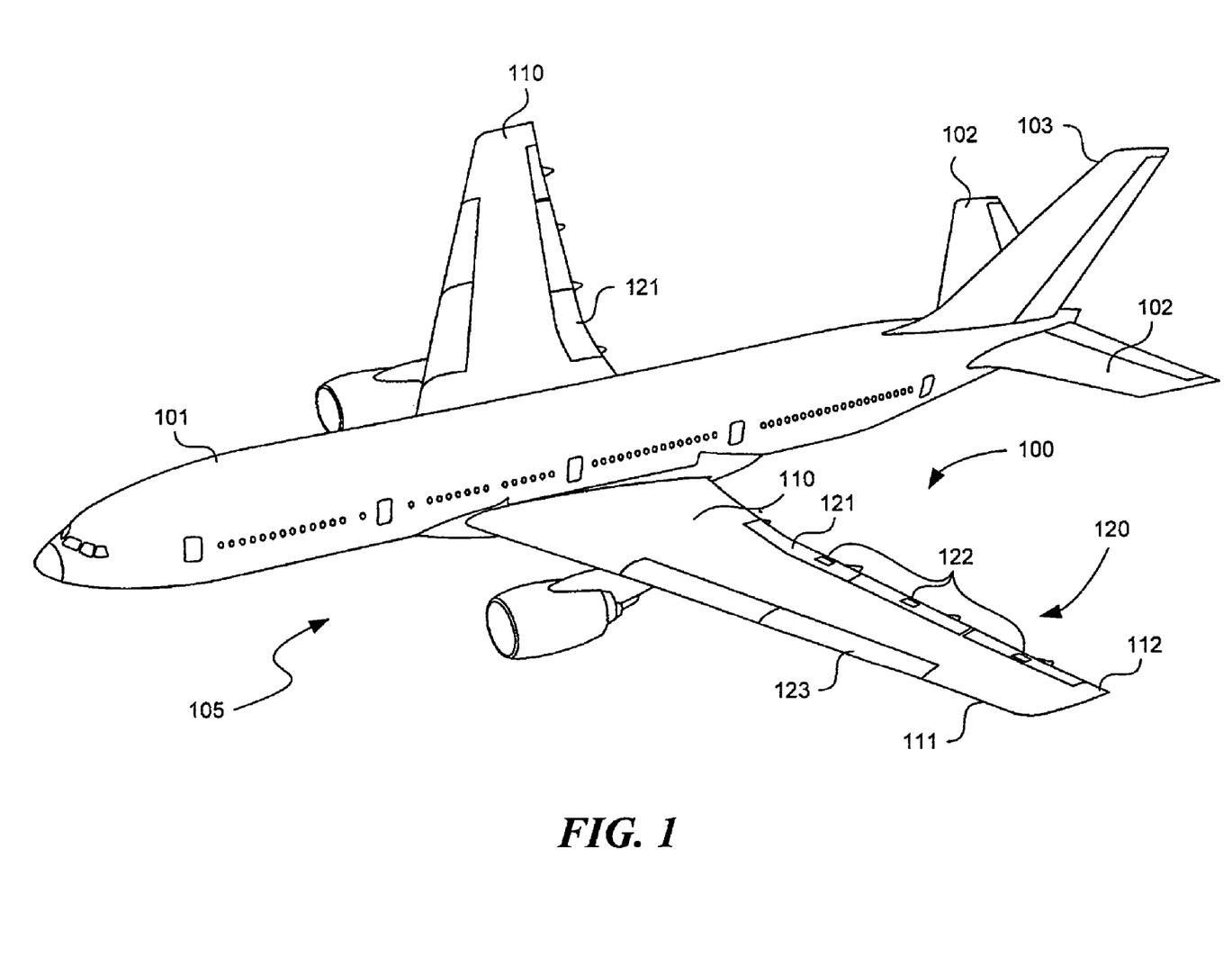
FIG. 1 is an isometric illustration of an aircraft having a system installed in accordance with an embodiment of the disclosure.

FIG. 1 is an isometric illustration of an aircraft 105 that includes a fuselage 101, wings 110, horizontal stabilizers 102, and a vertical stabilizer 103. The wings 110 can include a leading edge 111 and a trailing edge 112, with aerodynamic devices 120 carried by and deployed from the wings 110. The aerodynamic devices 120 can include trailing edge devices 121, "mini"-trailing edge devices 122 carried by the trailing edge devices 121, and/or leading edge devices 123. The aerodynamic devices 120, together with other supporting components, can form an overall system 100 that is used to control the aerodynamic behavior of the aircraft 105. Representative embodiments of aerodynamic devices and associated methods suitable for the wing 110 and/or other external flow surfaces (e.g., the horizontal stabilizer 102 and/or vertical stabilizer 103) are described further below with reference to FIGS. 2-8.

Figure 2:
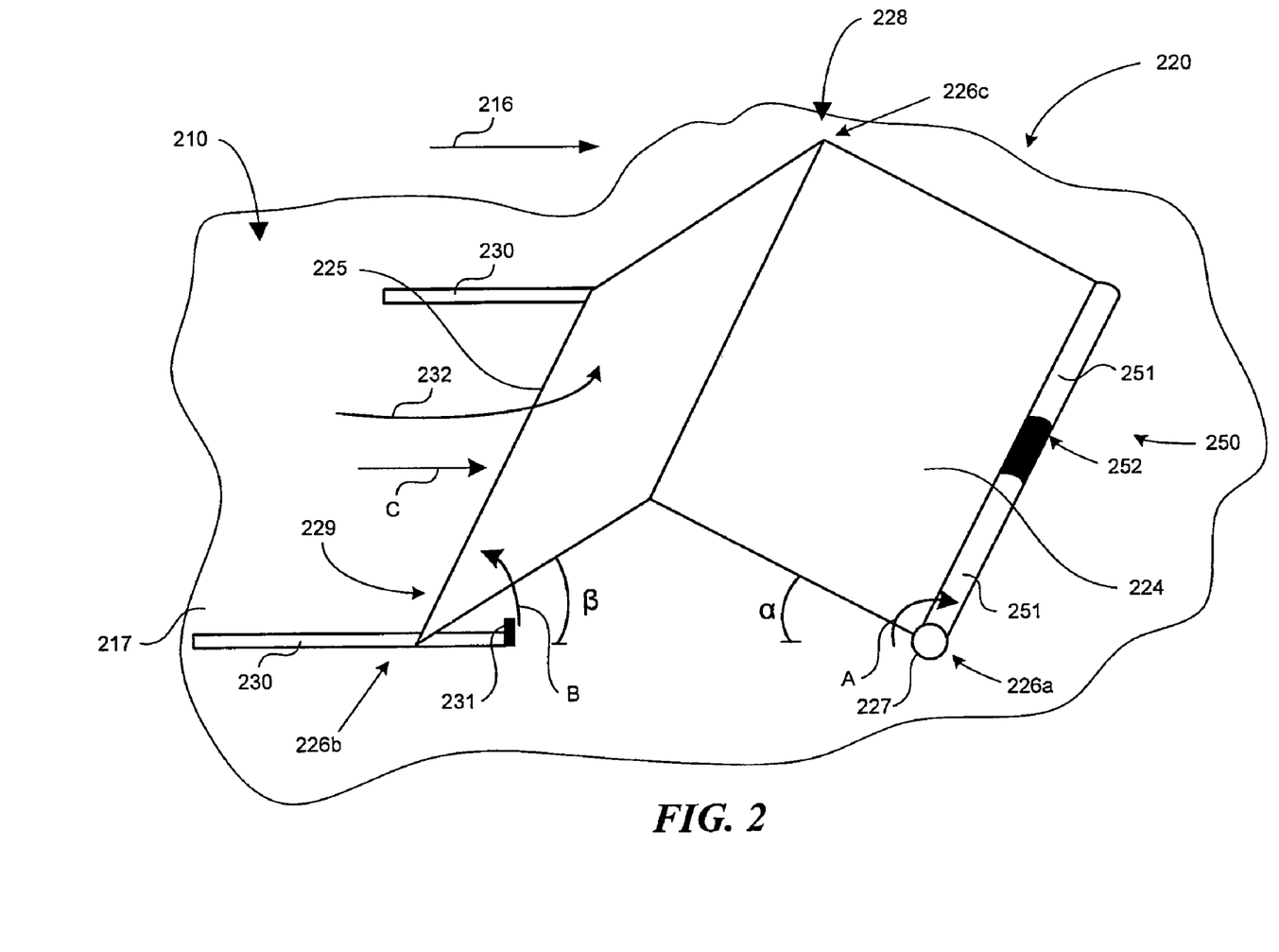
FIG. 2 is a partially schematic, isometric illustration of a deployable device configured in accordance with an embodiment of the disclosure.

FIG. 2 is a schematic, isometric illustration of a deployable device 220 carried by an external flow body 210, a portion of which is shown in FIG. 2. The external flow body 210 can be immersed in an external flow 216, e.g., an airflow or other fluid flow. The deployable device 220 can include a first component 224 coupled to a second component 225. When stowed, the first and second components 224, 225 can lay flat, e.g., generally parallel to and/or flush with an exposed surface 217 of the external flow body 210. When deployed, as shown in FIG. 2, the outer or wetted surface of the second component 225 (and to a lesser extent, the first component 224) can modify the fluid flow over the external flow body 210 to provide a desired effect. For example, if the exposed surface 217 is a wing upper surface, the second component 225 can operate as a speed brake in the position shown in FIG. 2. If the exposed 217 surface is a wing lower surface, the second component 225 can enhance the lift of the external flow body 210, operate as an aileron, and/or provide a trim function. If the exposed surface 217 is a helicopter rotor blade, the second component 225 can operate as a noise reduction device. These and other representative installations of the deployable device 220 are described in further detail later.

In a particular embodiment shown in FIG. 2, the first component 224 is hingedly coupled to the external flow body 210 at a first location 226a via a hinge joint 227. The second component 225 is translatably (e.g., slideably) coupled to the external flow body 210 at a second location 226b via a translating (e.g. sliding) coupling 229. The translating coupling 229 can include one or more guide paths 230 (e.g., linear guide paths) that guide the translational motion of the second component 225. The guide paths 230 can include channels, rails or other suitable structures. The second component 225 can slide, roll (via one or more rollers or linear bearings) or otherwise translate along the guide paths 230. One or more stops 231 (one of which is visible in FIG. 2) can stop the translational motion of the second component 225 at a preselected location, e.g., corresponding to a maximum deployed position.

The second component 225 can be hingedly coupled to the first component 224 at a third location 226c via a second hinge joint 228. The second hinge joint 228 can be located at the edges of both the first and second components 224, 225, or at other locations of these components. In a particular aspect of an embodiment shown in FIG. 2, the first component 224 acts to drive the second component 225. Accordingly, the first component 224 can be coupled to an actuator device 250. In a particular embodiment, the actuator device 250 includes one or more rotary actuators 251 (two are shown in FIG. 2) connected between the first component 224 and an attachment point 252 at the external flow body 210. When actuated, the actuator device 250 rotates the first component 224, as indicated by arrow A through angle $\alpha$. This in turn causes the second component 225 to translate from left to right, as indicated by arrow C, and to rotate relative to the external flow body 210 as indicated by arrow B, through angle $\beta$. Accordingly, the second component 225 moves along a motion path 232.

As the second component 225 moves along the motion path 232, the projected area of the second component 225 in a plane normal to the direction of the external flow 216 increases. Accordingly, the dynamic pressure acting on the second component 225 also increases. A component of the force provided by the dynamic pressure can act in parallel with the motion path 232 to reduce the load required by the actuator device 250 as it moves the second component 225 to one or more deployed positions.

Figure 3A:
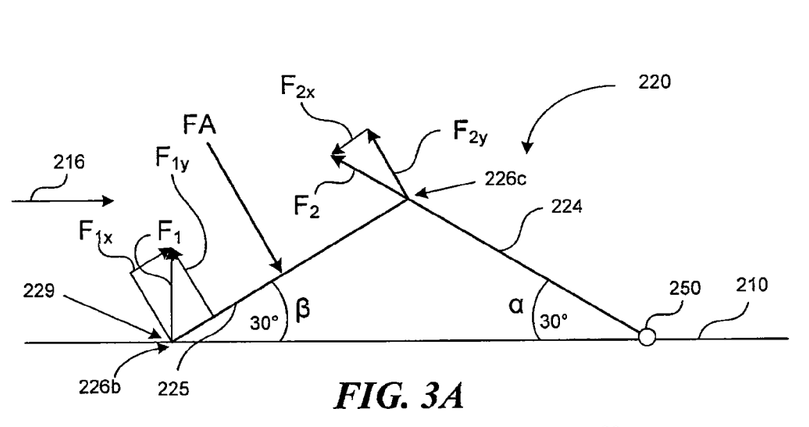
FIG. 3A is a graph illustrating actuator load as a function of deployment angle for a deployable device configured in accordance with a particular embodiment of the disclosure.
Figure 3B:
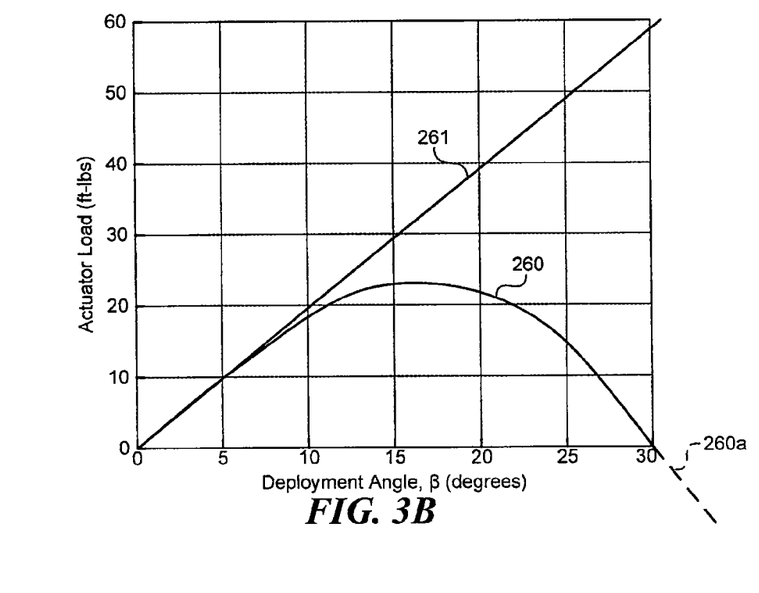
FIG. 3B is a representative force diagram illustrating forces on a deployable device at an equilibrium point in accordance with an embodiment of the disclosure.

FIG. 3A illustrates the forces on the second component 225 when angles $\alpha$ and $\beta$ are 30°, in accordance with a particular embodiment at the disclosure. FIG. 3B is a graph illustrating the load put out by the actuator device 250 (shown by line 260) as a function of the deployment angle $\beta$ shown in FIG. 3A. The load is represented in FIG. 3B as a torque (for a rotary actuator), and can have other dimensions in other embodiments, depending upon the actuator type. For purposes of comparison, the actuator load required for a conventional device having the same dimensions as the second component 225 is also shown in FIG. 3B by line 261. The conventional device is represented by a single flat panel that is rotatable about a hinge line and is driven by a rotary actuator located at the hinge line. The data provided in FIG. 3B assume that the aerodynamic load provided by the dynamic pressure of the external flow 216 acts at the center of the second component 225 and that the aerodynamic load increases proportionally with the projected frontal area (e.g., the area facing directly upstream) presented by the second component 225. It is also assumed for purposes of this calculation that the first component 224 does not receive a significant amount of aerodynamic loading.

As shown in FIG. 3B, a conventional device typically requires a linearly increasing actuator load that continues to increase throughout the deployment range (see line 261). By contrast, a deployable device 225 in accordance with an embodiment of the disclosure can require an increasing actuator load over only a portion of its motion (e.g., from about 0° about 17° shown in FIG. 3B), but then the load required of the actuator device 250 decreases because a portion of the increased aerodynamic load placed on the second component 225 by the external flow 216 acts along the motion path 232 (FIG. 2). In this particular arrangement, the required actuator load decreases to zero at 30° of deployment, at which point the second component 225 is in an equilibrium position.

If the second component 225 were deployed further (as indicated by dashed line line 260a), the actuator device 250 would be subjected to a negative load. Put another way, beyond 30°, the actuator device 250 acts to resist further motion of the second component 225 toward the deployed position. Alternatively, the actuator device 250 can be configured to be overridden by the aerodynamic force applied by the external flow 216 so as to allow the second component 225 to quickly move (e.g., snap) to a fully deployed position beyond 30°.

As noted above, FIG. 3A illustrates the forces acting on the second component 225 at the equilibrium point (e.g., when the deployment angle β is 30°). The forces acting on the second component 225 include an aerodynamic force FA acting normal to the second component 225, and reaction forces $F_1$ and $F_2$ acting at the second location 226b and the third location 226c, respectively. Because reaction force $F_2$ acts directly along the plane of the first component 224, it produces no moment at the first location 226a, and accordingly, no output moment is required by the actuator 250. Because the coupling at the second location 226b is a translating (e.g., sliding) coupling 229, no moment is provided at the second 226b location either. The vector components of the first and second forces in the Y direction (shown as $F_{1y}$ and $F_{2y}$, acting normal to the second component 225) add to counter the force in the opposite direction provided by the aerodynamic force FA. The vector components of the first and second forces in the X direction (shown as $F_{1x}$ and $F_{2x}$, acting parallel to the second component 225) are equal and opposite and therefore offset each other. Accordingly, the second component 225 is at equilibrium at a deployment angle β of 30°.

Figure 4A:
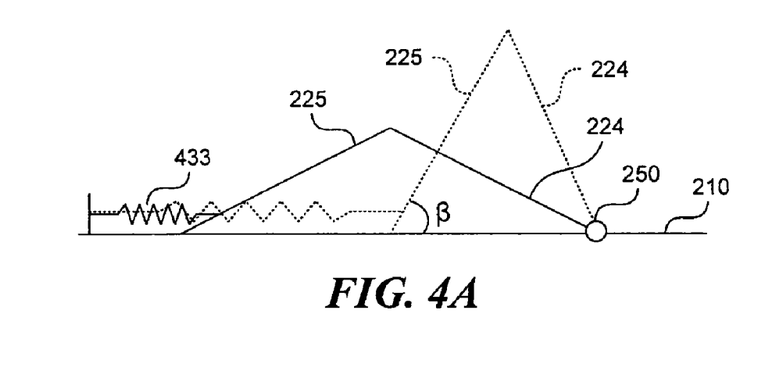
FIG. 4A schematically illustrates a deployable device having a resilient element that applies a force tending to restore the device to the stowed position in accordance with an embodiment of the disclosure.

In some instances, it may be desirable to deploy the second component 225 by an amount greater than 30° before reaching equilibrium. For example, it may be desirable to delay the point at which equilibrium is reached in order to allow the deployment angle β to be higher at the fully deployed position. In still further particular arrangements, it may be desirable to do so without allowing the second component 225 to "snap" to its fully deployed position, e.g., if the actuator device 250 is easily overridden by the applied aerodynamic force FA. One approach to achieving this result is to select the actuator device 250 to resist the aerodynamic force FA tending to snap the second component 225 to its fully deployed position. Two other representative approaches are illustrated schematically in FIGS. 4A and 4B respectively. In FIG. 4A, a resilient element 433 (e.g., a spring or other suitable device) is shown connected between the external flow body 210 and the second component 225. The resilient element 443 is configured to force the second component 225 toward the stowed position. Accordingly, the actuator device 250 must overcome the restoring force of the resilient element 433 as it moves the first and second components 224, 225 to a deployed position (shown in dotted lines). This in turn shifts the equilibrium point to a higher deployment angle. Accordingly, the second component 225 can be deployed to a greater angle β, as is shown in dashed lines in FIG. 4A, before the equilibrium point is reached. In other embodiments, the resilient element 443 can tend to move the second component 275 to another position, e.g., the equilibrium position, deployed position, or other position.

Figure 4B:
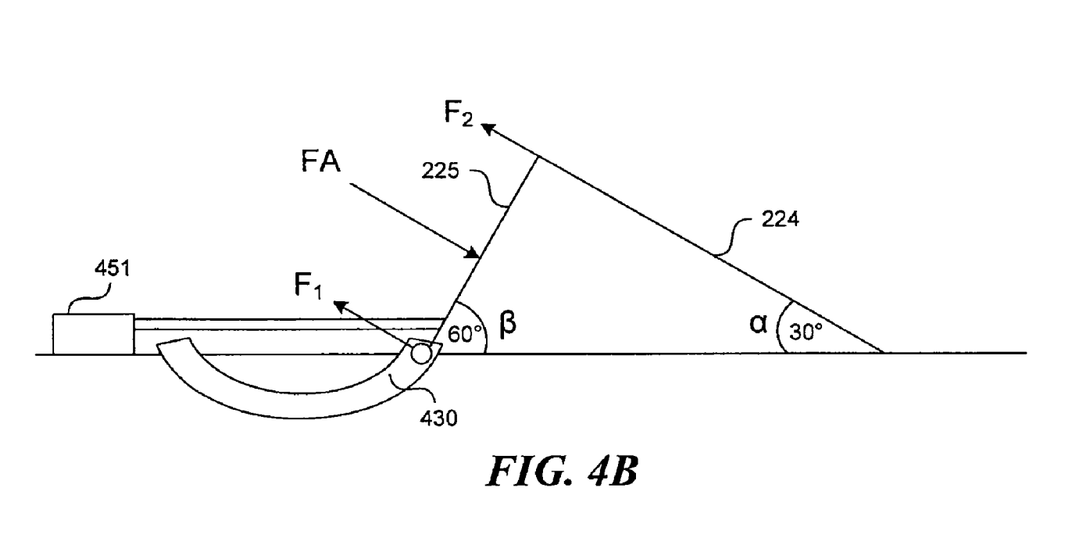
FIG. 4B schematically illustrates a deployable device having a translating coupling forming a curved guide path in accordance with another embodiment of the disclosure.

FIG. 4B illustrates another arrangement for achieving an increased maximum deployment angle β, in which the second component 225 moves along a curved (e.g., arcuate) guide path 430. In this arrangement, the second component 225 can also be moved to a greater deployment angle β before reaching equilibrium (e.g., β of about 60°) as a result of the current guide path 430. For purposes of illustration, the actuator 451 shown in FIG. 4B is a linear actuator, but in other embodiments can include a rotary actuator, as was described above with reference to FIG. 2. The guide path 430 can have a simple arcuate shape, as shown in FIG. 4B, or other, possibly more complex shapes, in other embodiments, depending upon the particular design requirements.

Figure 5:
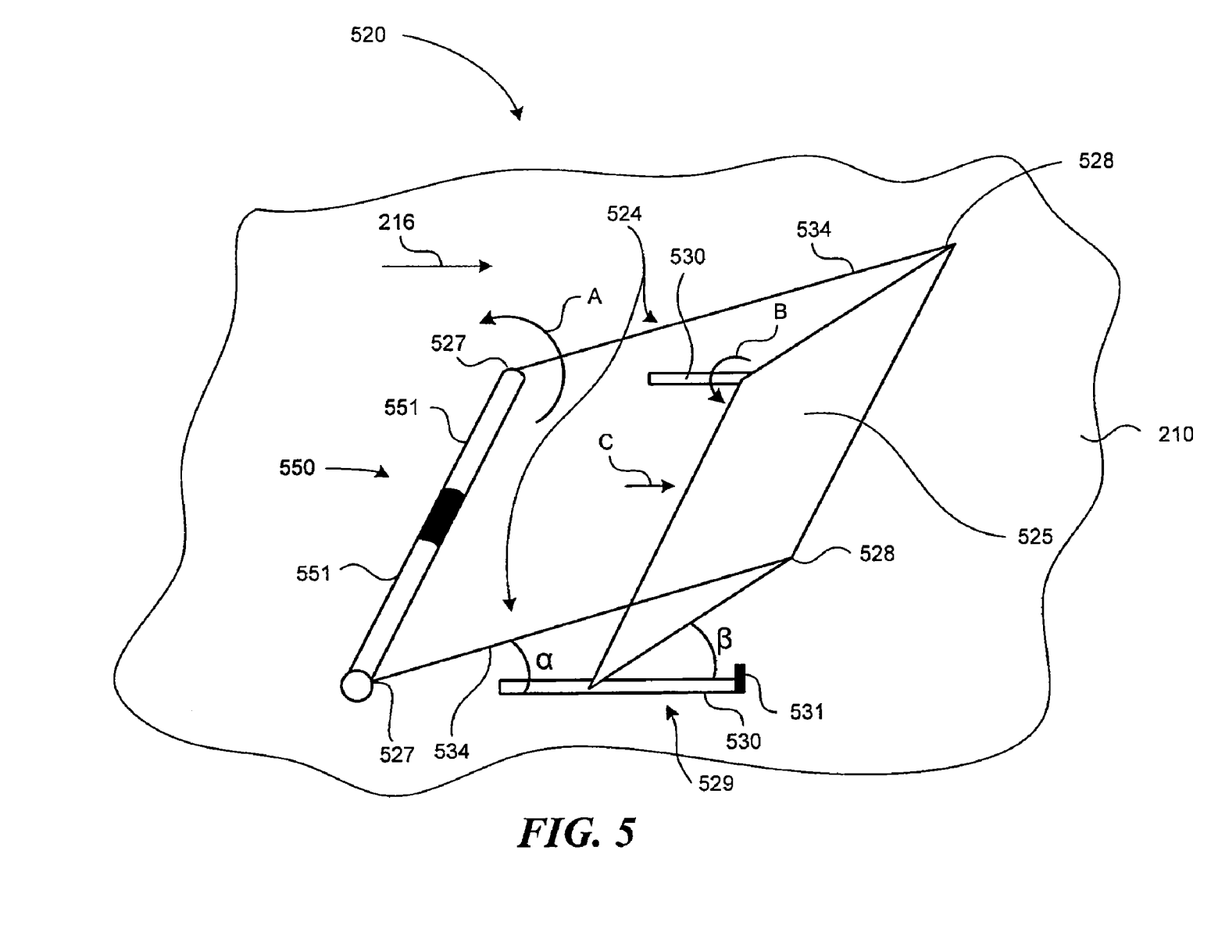
FIG. 5 is a partially schematic, isometric illustration of a deployable device having pivoting rods coupled to a translating component in accordance with an embodiment of the disclosure.

FIG. 5 illustrates a deployable device 520 configured in accordance with another embodiment. In this embodiment, the deployable device 520 includes a second component 525 coupled to a first component 524 that extends forward, rather than aft, of the second component 525. For example, the first component 524 can include two rods 534, each coupled to the external flow body 210 at a first hinge joint 527, and each coupled to the second component 525 at a second hinge joint 528. The second component 525 is coupled to the external flow body 210 with a translating coupling 529 and translates (e.g., slides) along guide paths 530 when deployed, until it reaches corresponding stops 531, one of which is visible in FIG. 5. The first component 524 can be driven by an actuator device 550 (generally similar to the actuator device 250 described above) that includes two rotary actuators 551. The rotary actuators 551 can include torque tube devices, shape memory alloy (SMA) devices, and/or other devices that apply a moment to the first component 524. As the second component 525 increases its deployment angle β, the force provided by the external flow 216 on the second component 525 increases, thereby reducing the load required by the actuator device 550 to further deploy the deployable device 520.

Figure 6:
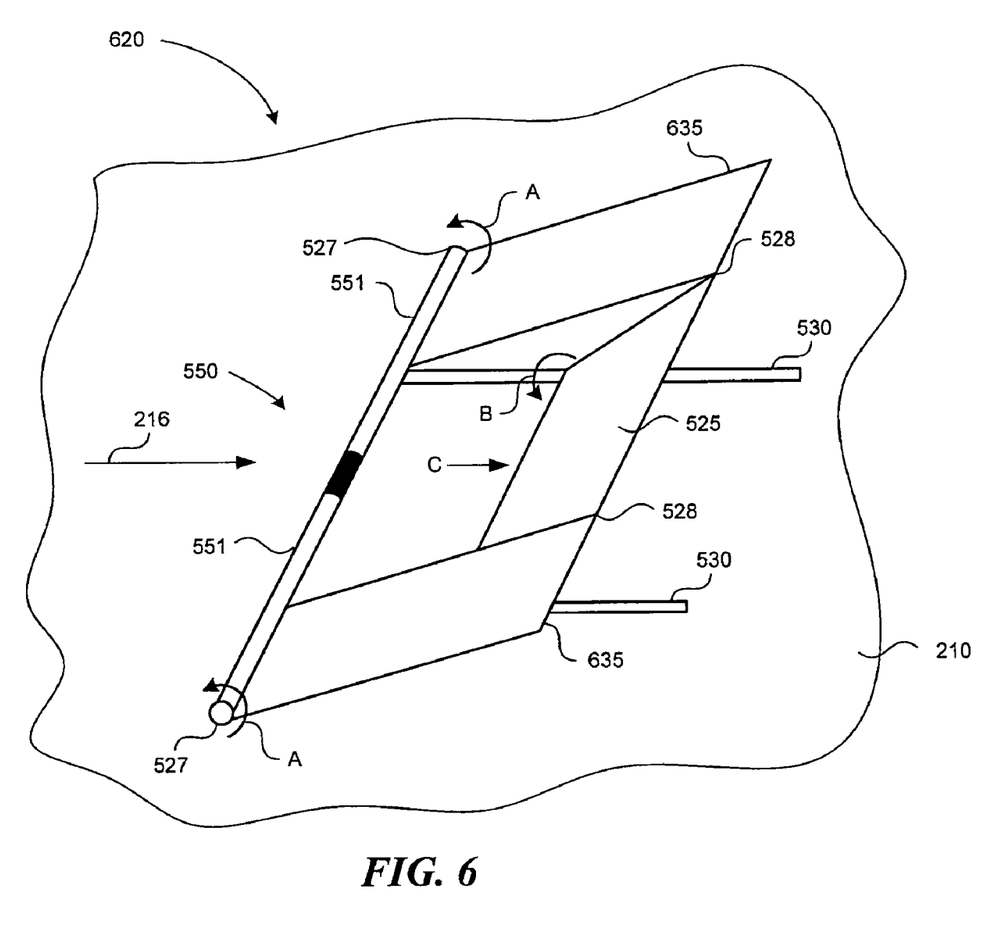
FIG. 6 is a partially schematic, isometric illustration of a deployable device having pivoting panels coupled to a translating panel in accordance with another embodiment of the disclosure.

FIG. 6 schematically illustrates another deployable device 620 that operates generally similarly to the deployable device 520 described above with reference to FIG. 5, but that includes panels 635 in place of the rods 534. The aerodynamic force applied by the external flow 216 on the panels 635 can act to drive the panels 635 (and therefore the second component 525) downwardly toward the stowed position, while the aerodynamic force acting on the second component 525 itself can act to deploy the second component 525. Accordingly, the panels 635 can delay the point at which equilibrium (discussed above with reference to FIGS. 3A and 3B) is reached and allow greater deployment angles for the second component 525 before equilibrium. The size of the panels 535 relative to the second component 525, as well as the locations of the hinge joint 528 and/or other design. elements can be selected to provide for greater or lesser angles at the equilibrium point.

Figure 7:
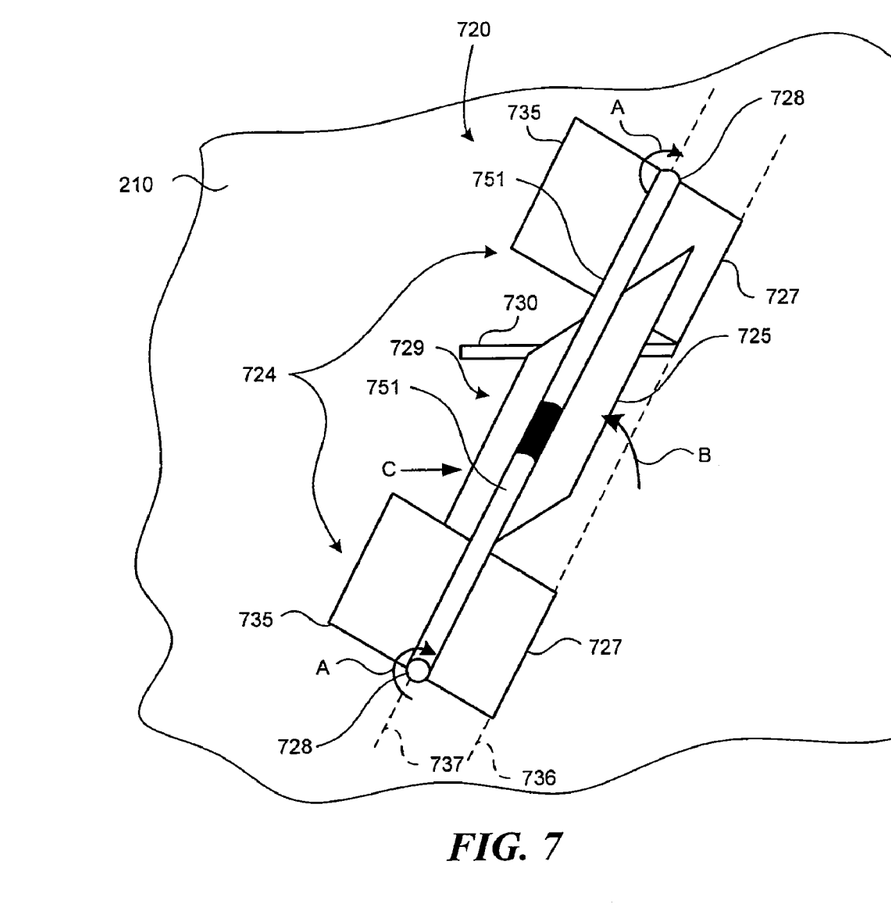
FIG. 7 is a partially schematic, isometric illustration of a deployable device having panels rotating in opposite directions in accordance with an embodiment of the disclosure.

FIG. 7 illustrates a deployable device 720 configured in accordance with yet another embodiment. In this embodiment, the deployable device 720 has a first component 724 that includes two panels 735. Each panel 735 is hingedly coupled to the external flow body 210 at corresponding hinge joints 727 aligned along a first hinge line 736. A second component 725 is translatably coupled to the external flow body 210 at a translating coupling 729, and is hingedly coupled to the first panels 735 via corresponding second hinge joints 728 aligned along a second hinge line 737. Actuators 751 are connected between the second component 725 and the panels 735 of the first component 724. As the actuators 751 are activated, they rotate the first panels 735, as indicated by arrows A, which causes the second component 725 to rotate in the opposite direction, as indicated by arrow B, and slide or otherwise translate along a guide path 730, as indicated by arrow C. In this arrangement, the aerodynamic forces acting on the second component 725 and driving it toward the deployed position also act on the first component 724 (e.g., the panels 735) to further increase the relative angles between the first and second components 724, 725, and therefore the deployment angle of the second component 725. Accordingly, this arrangement can be used where it is desirable to reach the equilibrium point at relatively low deployment angles and/or where it is desirable to position the actuators 751 at the second hinge line 737.

Figure 8:
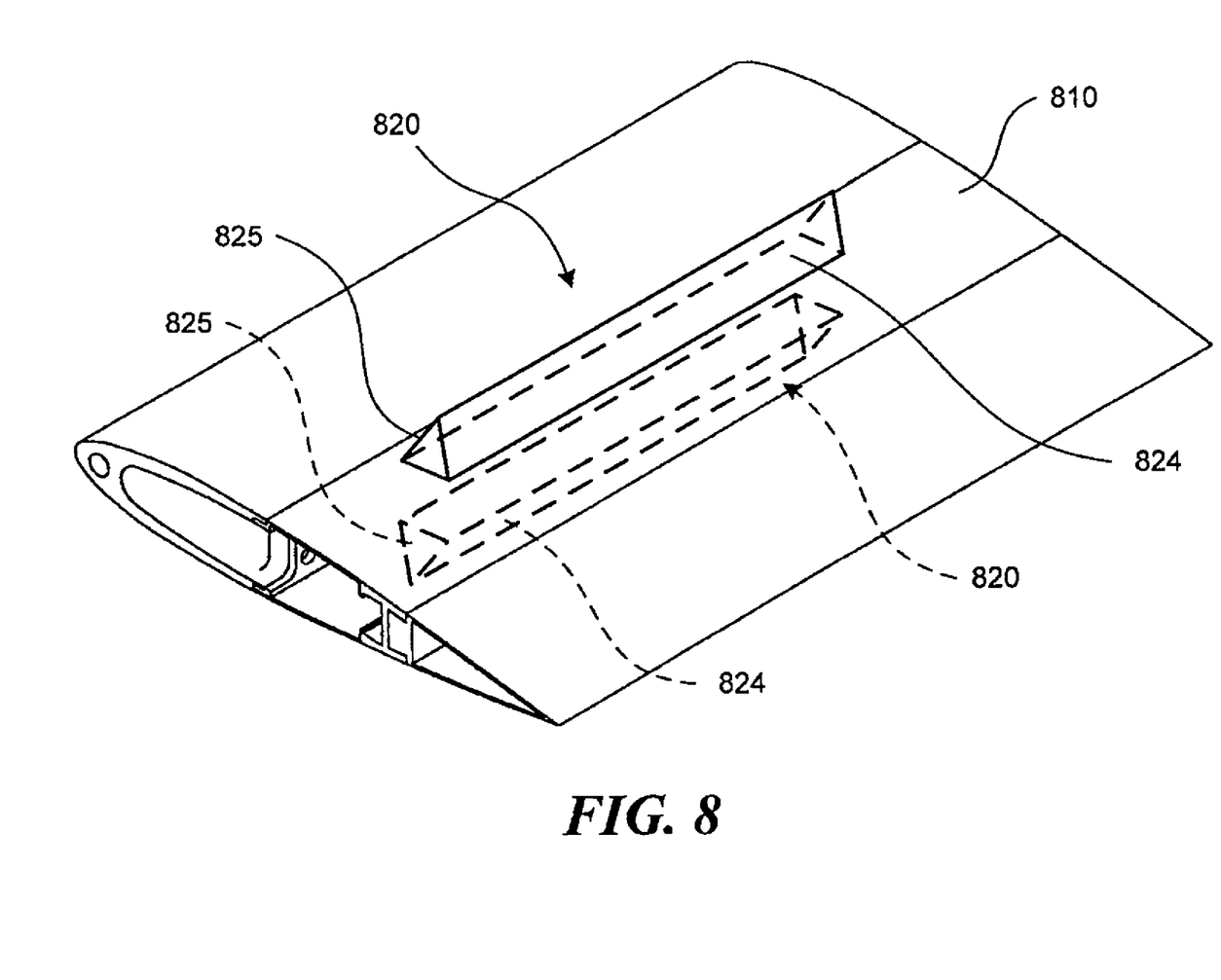
FIG. 8 schematically illustrates deployable devices installed on an airfoil-shaped external flow body in accordance with an embodiment of the disclosure.

Any of the foregoing deployed devices can be installed on aircraft wings as leading edge devices or trailing edge devices, as discussed above with reference to FIGS. 1 and 2. As was also discussed with reference to FIG. 1, these devices may be installed at other locations of the aircraft, for example, the horizontal stabilizer 102 and/or the vertical stabilizer 103. In still further embodiments, such devices may be installed on other lifting bodies. For example, FIG. 8 illustrates an external flow body 810 that can correspond to a helicopter rotor blade and that can include two deployable devices 820 installed on opposite surfaces of the rotor blade. Each of the deployable devices 820 can include a first component 824 and a second component 825. For purposes of illustration, the first and second components 824, 825 are generally similar to those described above with reference to FIG. 2, but in other embodiments, these components can have any of the foregoing configurations described above. The deployable devices 820 can act to reduce rotor noise rather than augment lift or provide for vehicle control.

In still further embodiments, devices generally similar to those described above with reference to FIGS. 1-8 can be applied to still further external flow bodies. In one example, such devices may be positioned on a body and deployed to "morph" the shape of the body. In another example, such devices can be installed on other vehicles exposed to an external air flow. In still further embodiments, such devices can be installed on submarines, boat hulls, and/or other surfaces that are immersed in a fluid flow stream other than air.

One feature of a deployable device in accordance with any of several of the foregoing embodiments is that the device can be configured so that, over at least a portion of the motion range of the device, the force applied to the device by the adjacent flow acts to reduce the load required by a corresponding actuator driving the device. This is unlike a typical conventional deployable device, for which the load applied by the external flow typically increases the load required by the actuator as the device deploys. An advantage of the foregoing feature described above with reference to representative embodiments of the present disclosure is that it can reduce the size and power requirements of the actuator that drives the deployable device. As a result, the actuator can be easier to integrate with surrounding structures, and can consume less power when deploying the device to which it is coupled. In addition, the actuator can have a lower weight than conventional actuators used to drive similarly sized devices, and can accordingly reduce overall aircraft weight and/or increase aircraft operating efficiency.

From the foregoing, it will be appreciated that specific embodiments have been described herein for purposes of illustration, but that various modifications may be made in other embodiments. For example, while rotary actuators were discussed in the context of many of the foregoing embodiments, in other embodiments, other types of actuators (e.g., linear actuators) can be used. The relative sizes of the various components discussed above, and the positions of the couplings discussed above can be selected and/or adjusted to produce selected results (e.g., selected maximum deployment angles and/or equilibrium angles). Certain aspects described in the context of particular embodiments may be combined or eliminated in other embodiments. For example, a particular deployable device can include multiple-element second components and a single first component rather than multiple-element first components and a single second component. In another example, the resilient element 433 shown in FIG. 4A can be applied to other representative devices, as can the curved guide path 430 shown in FIG. 4B. In any of the foregoing embodiments, the relative sizes, positions and coupling arrangements can be selected based on particular design requirements. Further, while advantages associated with certain embodiments have been described in the context of those embodiments, other embodiments may also exhibit such advantages, and not all embodiments need necessarily exhibit such advantages. Accordingly, the disclosure can include other embodiments not shown or described above.

I claim:

1. An aircraft system, comprising:
   a lifting body;
   a deployable aerodynamic device carried by and movable relative to the lifting body, the aerodynamic device including a first component pivotably coupled to the lifting body at a first location, and a second component translatably coupled to the lifting body at a second location, the first and second components being pivotably connected to each other at a third location; and
   an actuator device coupled to the aerodynamic device and positioned to move the aerodynamic device relative to the lifting body along a motion path between a stowed position and a deployed position, the aerodynamic device being exposed to an adjacent airstream when in the deployed position; and
   wherein the first component includes a first panel, the second component includes a second panel, and the actuator device includes at least one actuator coupled between the lifting body and the first panel at the first location to rotate the first panel relative to the lifting body, causing the second panel to translate along a guide path and rotate relative to the lifting body.

2. The aircraft system of claim 1 wherein the motion path has a first portion over which the load put out by the actuator device increases as the aerodynamic device moves toward the deployed position, and a second portion over which the load put out by the actuator device decreases as the aerodynamic device moves toward the deployed position.

3. The aircraft system of claim 1 wherein the first and second components are both exposed to the adjacent airstream around the lifting body when the aerodynamic device is in the deployed position.

4. The aircraft system of claim 1 wherein the deployed position is one of multiple deployed positions.

5. The aircraft system of claim 1 wherein the at least one actuator includes at least one rotary actuator.

6. The system of claim 5 wherein a first edge of the first panel is hingedly connected to a second edge of the second panel at the third location.

7. The system of claim 1 wherein the first component includes spaced-apart first and third panels, and wherein the second panel is positioned between the first and third panels, and wherein the first, second and third panels rotate in the same direction relative to the lifting body as the aerodynamic device moves from the stowed position to the deployed position.

8. The aircraft system of claim 1, further comprising a resilient element positioned to oppose motion of the aerodynamic device toward the deployed position.

9. The aircraft system of claim 1 wherein the lifting body includes a wing, and wherein the aerodynamic device includes a trailing edge device carried by the wing.

10. The aircraft system of claim 1 wherein the lifting body includes a helicopter rotor blade.

11. The aircraft system of claim 1 wherein the second component slides relative to the lifting body along a curved guide path.

12. An external flow system, comprising:
an external flow body;
a deployable device carried by and movable relative to the external flow body, the deployable device including a first component pivotably coupled to the lifting body at a first location, and a second component translatably coupled to the lifting body at a second location, the first and second components being pivotably connected to each other at a third location; and
an actuator device operatively coupled between the external flow body and the deployable device, the actuator device being positioned to move the deployable device along a motion path between a stowed position and a deployed position, the motion path having a first portion over which the load delivered by the actuator device increases as the deployed device moves toward the deployed position, and a second portion over which the load delivered by the actuator device decreases as the deployed device moves toward the deployed position, the first portion being between the stowed position and the second portion, wherein the first component includes a first panel, the second component includes a second panel, and the actuator device includes at least one actuator coupled between the lifting body and the first panel at the first location to rotate the first panel relative to the lifting body, causing the second panel to translate along a guide path and rotate relative to the lifting body.

13. The system of claim 12 wherein the deployed position is one of multiple deployed positions, and wherein actuator device provides a peak load at a point along the motion path between the stowed position and the deployed position furthest from the stowed position.

14. The system of claim 12, further comprising a resilient member coupled between the deployable device and the external flow body and applying a force on the deployable device tending to force the deployable device toward the stowed position.

15. The system of claim 12 wherein the external flow body includes an airfoil, and wherein the deployable device includes an aerodynamic device exposed to an adjacent airflow when in the deployed position.

16. A method for operating an aircraft system, comprising:
moving an aerodynamic device, carried by a lifting body, away from a stowed position and toward a deployed position, wherein the aerodynamic device includes a first component pivotably coupled to the lifting body at a first location, and a second component translatably coupled to the lifting body at a second location, the first and second components being pivotably connected to each other at a third location, the first component including a first panel and the second component including a second panel, and wherein moving the aerodynamic device includes actuating at least one actuator device coupled between the lifting body and the first panel at the first location to rotate the first panel and cause the second panel to translate along a guide path and rotate relative to the lifting body.

17. The method of claim 16 wherein rotating the first panel includes increasing a relative angle between the second component and the lifting body while decreasing a relative angle between the second component and the first component.

18. The method of claim 16 wherein moving the aerodynamic device away from the stowed position includes moving the aerodynamic device against a force provided by a resilient member coupled to the aerodynamic device.

19. The method of claim 16 wherein moving the aerodynamic device toward the deployed position includes:
moving the aerodynamic device over a first range of motion by increasing an output provided by the actuator device, while an external aerodynamic force on the aerodynamic device opposing the motion increases; and
moving the aerodynamic device over a second range of motion beyond the first range of motion while decreasing the output provided by the actuator device as the external aerodynamic force opposing the motion of the aerodynamic device toward the deployed position decreases.

* * * * *